(Model.)

J. SHANNON.
ICE CUTTING MACHINE.

No. 244,824.  Patented July 26, 1881.

WITNESSES:
A. Schehl.
C. Sedgwick

INVENTOR:
J. Shannon
BY Munn & Co
ATTORNEYS.

UNITED STATES PATENT OFFICE.

JAMES SHANNON, OF COHOES, NEW YORK.

ICE-CUTTING MACHINE.

SPECIFICATION forming part of Letters Patent No. 244,824, dated July 26, 1881.

Application filed December 10, 1880. (Model.)

*To all whom it may concern:*

Be it known that I, JAMES SHANNON, of Cohoes, in the county of Albany and State of New York, have invented a new and Improved Ice-Cutting Machine, of which the following is a specification.

The invention consists of a sled-shaped frame supporting vertical side standards, on which are pivoted forward-projecting arms, that are adjustable in a vertical plane by eccentrics and levers, and carry on their free ends vertically-revolving circular saws for cutting the ice, which saws are operated by suitable belts and pulleys or gearing that form part of the device; and it consists, further, of a series of revolving toothed wheels keyed on a horizontal cross-shaft in the rear portion of the device, which wheels are designed to rest upon the ice and to urge the machine forward by their revolutions. The saw-carrying arms and the rear portion of the machine are also provided with platforms for the operators to stand upon or for the reception of weights to force the saws and toothed wheels into the ice for their more efficient work.

Figure 1:
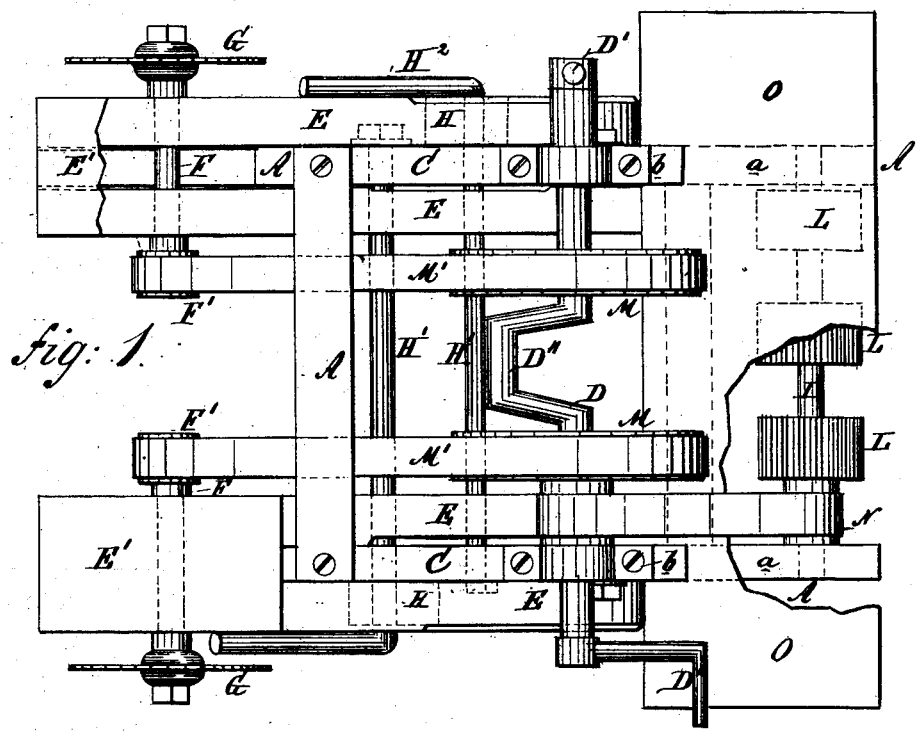
Figure 2:
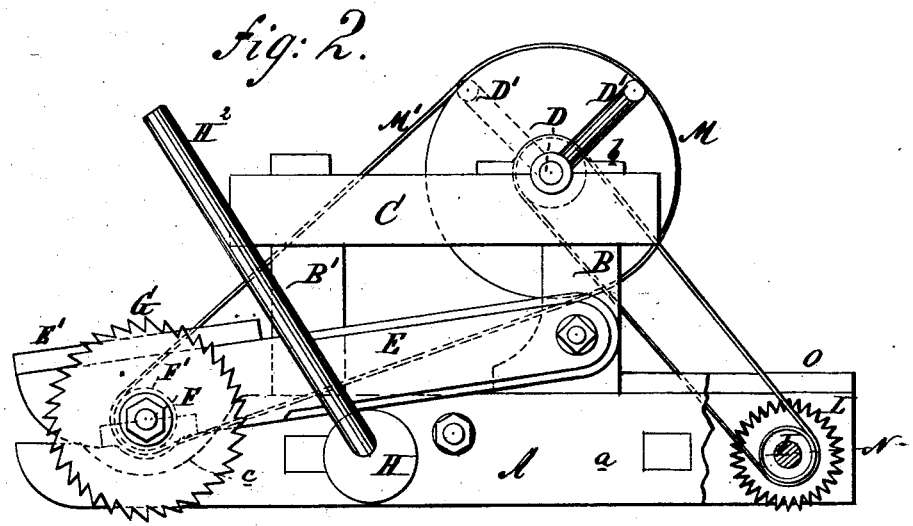

Figure 1 is a plan of the machine with parts broken away to exhibit other parts. Fig. 2 is a side elevation of the machine with parts broken away to exhibit other parts.

Similar letters of reference indicate corresponding parts.

In the drawings, A represents the sled-shaped frame, on each side of runner *a* of which are two vertical standards, B B', on the tops of which are secured parallel horizontal timbers C, that serve as bearings for the driving-shaft D, which shaft D is held down in place by the caps *b*. On either side of each rearmost standard, B, is pivoted an arm, E, that projects forward to about the front ends of the runners *a*, and through the forward ends of each pair of arms E is journaled a horizontal arbor or shaft, F, that carries on its laterally-extended end a circular saw, G, that is designed to revolve in a vertical plane. Across the forward ends of each pair of arms E, on the upper faces thereof, a platform, E', is secured for the operators to stand upon, or for weights to be placed upon, for the purpose of forcing the saws G into the ice when the machine is in operation to make them cut deeper.

The upper edges of the runners *a* are cut away, as shown in dotted lines at *c*, to permit the depression of the forward ends of said arms E, and of the saws G, according to the depth to which the ice is to be cut. These arms E are vertically adjustable in pairs by means of eccentrics H, that are placed on the outside of each runner *a* on separate shafts H', that extend from one runner *a* to the other, an end of each shaft H' being bent up on opposite sides of the machine to form a handle or lever, H², for the convenience of the operator, so that by moving the levers H² he can elevate or depress the saws G separately at will, so that one saw can be cutting while the other is inoperative, or both may be cutting or both be raised together when it is desired to move the machine from one place to another on the ice.

Journaled in the rear ends of the runners *a* is a horizontal shaft, I, on which are keyed the toothed wheels L, whose peripheries extend below the lower edges of the runners *a*, and whose teeth are intended to enter the ice as the said wheels L are revolved, and thereby urge the machine forward.

On the shaft D, which may be operated by end cranks, D', and central crank, D'', as shown, or in any other convenient manner, are fixed two large driving-pulleys, M, from which power is transmitted to drive the saws G by means of belts M', that run over pulleys F' on the shafts or arbors F, and from a pulley on the shaft D a belt transmits power to the pulley on the shaft I.

Secured across the top of the rear ends of the runners *a* is a platform, O, for the operators to stand upon, or for the reception of weights to press the wheels L into the ice to give them a better hold thereon as the machine is operated.

This machine may be operated by hand or steam power, as may be most convenient, and may be modified without departing from my invention. When operated by hand power the operators (a number of them) will stand on the platform O, and, taking hold of the cranks D' D'', put the parts in motion, and at the same time the weight of the operators will serve to keep the teeth of the wheels L well in the ice, so that they shall propel the machine in the required direction. By reversing the motions of the cranks D' D'' the machine can be made to run backward, as the saws G are designed to cut freely, whether revolving forward or backward. The cuts first made by them can thus be deepened at will.

It will be seen that with this machine two parallel cuts can be simultaneously made. The distance between them determines the width of the block of ice to be cut, and the cranks on the driving-shaft D afford facilities or room for the application of power to the center as well as to the ends of said shaft.

Having thus fully described my invention, I claim as new and desire to secure by Letters Patent—

1. An ice-cutting machine constructed substantially as herein shown and described, consisting of frame A, vertically-adjustable arms E, carrying circular saws G, driving-shaft D, and revolving toothed wheels L, arranged and operated as set forth.

2. In an ice-cutting-machine, the combination, with the adjustable arms E and saws G, of the eccentric H, substantially as herein shown and described, whereby said saws are elevated or depressed, as set forth, for regulating the depth of the saw-cuts.

3. In an ice-cutting-machine, the combination, with the frame A and arms and saws E G, of the crank-shaft D, provided with cranks D' D'', substantially as herein shown and described, whereby power can be applied to the center and ends of the shaft, as set forth.

JAMES SHANNON.

Witnesses:
JOHN SHANNON,
LEES WRIGLEY.